M. C. TEN EYCK.
Tailors' Drafting Apparatus.
No. 168,936. Patented Oct. 19, 1875.
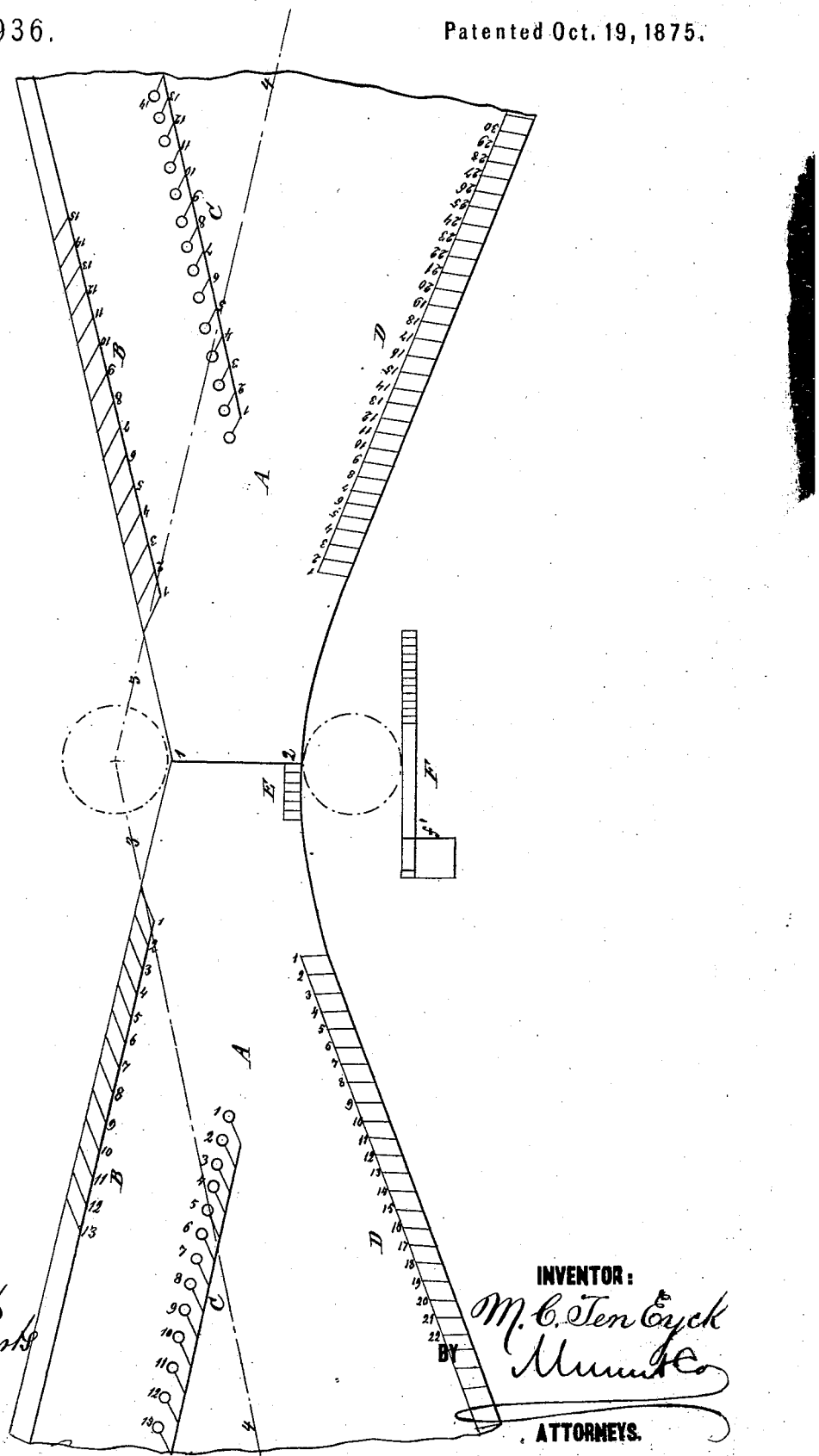

UNITED STATES PATENT OFFICE.

MATTHEW C. TEN EYCK, OF ST. PAUL, MINNESOTA.

IMPROVEMENT IN TAILORS' DRAFTING APPARATUS.

Specification forming part of Letters Patent No. 168,936, dated October 19, 1875; application filed August 28, 1875.

*To all whom it may concern:*

Be it known that I, MATTHEW C. TEN EYCK, of St. Paul, in the county of Ramsey and State of Minnesota, have invented a new and useful Improvement in Conformator and Transfer for Drafting Garments, of which the following is a specification:

The figure in the accompanying drawing is a plan view of my improved transfer.

The object of this invention is to furnish an improved conformator and transfer or scarf for drafting garments to fit the upper part of the human body, giving the true pitch or slope of the shoulders and the true balance of all other essential points with the same, thereby insuring an accurate fit. The device is simple in construction and convenient and reliable in use.

The invention consists in the conformator and transfer or scarf, provided with the scales or division-marks hereinafter described, and whether made in one or two pieces, as set forth.

A is the conformator and transfer or scarf, which is made in about the form shown in the drawing—that is to say, narrow in its middle part that passes over the shoulder, and wider toward its ends. Along the inner part of the scarf or conformator and transfer A are formed scales C of division-marks, which are formed parallel with, and at a little distance from, the scales B, and which have holes formed at said marks to allow the central seam in back and front to be seen through them. Along the outer edges of the parts of the conformator and transfer or scarf A are formed scales D of division-marks. The marks of the scales B C D are numbered from the top downward, as shown in the drawing.

In using the conformator and transfer it is placed over the shoulder with the point 1 next the neck, and is secured in place by a cord attached to it at the point 1, and passing around the neck. The parts of the scarf are then smoothed down upon the front and back of the person, and confined in place by a band passing around the waist. Then are noted the points of the scales B and C that cross the back seam, which seam is indicated in the drawing by the line 3 4. This will give the slope or pitch of back, and by measuring up from the point where scale B intersects the back seam to the collar-bone the exact height of coat in the neck is obtained. Then by noticing the top at 2 on shoulder, and where the scales B and C cross the center line of breast, which is indicated by the line 3 4 in the drawing, and by measuring up from the intersection of scale B with the center line of breast to the neck, nearly all the essential points of the garment will be obtained. While the scarf A is in the position hereinbefore described a flexible ruler, which is represented by diagram F, is put close under the arm, with the line *f'* parallel with the edge of the scarf of the scale D; press it close to the body, and note at what point of the scale D of the other part it strikes, and also what point of the scale upon the ruler F strikes the edge of the scarf at said scale D. The ruler F is then moved down to the waist, and the same notes are taken.

It will be observed that when the flexible ruler F is placed under the arm its point of intersection with the scale D will show whether the person be erect or stooping.

The balance of the garment is drafted in the usual way without the use of the scarf.

The transfer or scarf A may be made of leather, cloth, rubber, or a combination of two or more of these materials, or of any material sufficiently flexible to be fitted to the body, and having sufficient body to be used for drafting.

The scarf A may be made in one piece, as shown in the drawing, or it may be made in two pieces, the line of division passing through the line 1 2. In this case a scale, E, of division-marks is formed along the shoulder edge of one of the parts, so that, after the scarf has been fitted to the body and secured around the waist, the operator may note upon scale E how much the lap is at the point 2. This construction will give a greater range to the scales B C in case of extremely high or low shoulders.

Having thus described my invention, I claim as new and desire to secure by Letters Patent—

The conformator and transfer or scarf A, constructed as described, provided with the scales B C D, arranged in the manner shown, substantially as herein shown and specified.

MATTHEW C. TEN EYCK.

Witnesses:
FRED. WOODBOURNE,
WM. HENDRICKS.